United States Patent
Zhang et al.

(10) Patent No.: US 8,761,806 B2
(45) Date of Patent: Jun. 24, 2014

(54) METHOD, SYSTEM AND DEVICE FOR IMPLEMENTING POSITIONING MEASUREMENT

(75) Inventors: Dajun Zhang, Beijing (CN); Haiyang Quan, Beijing (CN); Jiayi Fang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/504,936

(22) PCT Filed: Oct. 28, 2010

(86) PCT No.: PCT/CN2010/001717
§ 371 (c)(1),
(2), (4) Date: Aug. 1, 2012

(87) PCT Pub. No.: WO2011/050580
PCT Pub. Date: May 5, 2011

(65) Prior Publication Data
US 2013/0040664 A1 Feb. 14, 2013

(30) Foreign Application Priority Data
Oct. 29, 2009 (CN) .......................... 2009 1 0235920

(51) Int. Cl.
*H04W 24/00* (2009.01)

(52) U.S. Cl.
USPC .................. 455/456.5; 455/456.1; 455/456.2; 455/456.3; 455/456.4; 455/456.6

(58) Field of Classification Search
USPC .......................................... 455/456.1–456.6
See application file for complete search history.

(56) References Cited

U.S. PATENT DOCUMENTS

| 2011/0098057 A1* | 4/2011 | Edge et al. | 455/456.1 |
| 2012/0108263 A1* | 5/2012 | Zhang | 455/456.1 |

FOREIGN PATENT DOCUMENTS

| CN | 1852591 A | 10/2006 |
| CN | 100446616 C | 12/2008 |

(Continued)

OTHER PUBLICATIONS

3GPP Technical Specification Group Radio Access Network, 3GPPTS 36.305 V9.0.0: Evolved Universal Terrestrial Radio Access Network (E-UTRAN), Stage 2 functional specification of User Equipment (UE) positioning in E-UTRAN (Release 9). 3rd Generation Partnership Project. Sep. 28, 2009, pp. 21-28, Chapter 7.

(Continued)

*Primary Examiner* — Olumide T Ajibade Akonai
*Assistant Examiner* — Jaime Holliday
(74) *Attorney, Agent, or Firm* — Kilpatrick Townsend & Stockton LLP (57) ABSTRACT

The present invention discloses a method, system and device for implementing positioning measurement. The method includes the steps of: determining a Timing Advance (TA) report format according to obtained information on whether a User Equipment (UE) can support the measurement of the receiving-transmitting(Rx-Tx) time difference and information on whether a base station (e.g. eNB)can support the measurement of the Rx-Tx time difference of the base station and the measurement of the Rx-Tx time difference of the UE in an Enhanced Cell Identity (E-CID) positioning process of the user equipment, and after the base station processes the E-CID positioning measurement, the positioning measurement result is returned to the Evolved Serving Mobile Location Center (E-SMLC) in the determined timing advance report format. The present invention can solve the problem in the prior art that the base station can not determine a specific timing advance report format to be used for returning a positioning measurement result to the E-SMLC.

11 Claims, 6 Drawing Sheets

(56) References Cited

FOREIGN PATENT DOCUMENTS

| CN | 100486356 C | 5/2009 |
|---|---|---|
| WO | 0225308 A1 | 3/2002 |

OTHER PUBLICATIONS

3GPP Technical Specification Group Radio Access Network. Physical Layer Procedures (TDD): 3G TS 25.224 version 1.0.0). 3rd Generation Partnership Project. Apr. 1999.

Nokia Siemens Networks et al: "Considerations for some LPP stage 2 outstanding issues", 3GPP Draft; R2-095985, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050390409, [retrieved on Oct. 6, 2009].

Ericsson et al: "Overview of Requirements for Enhanced Cell ID Positioning Method", 3GPP Draft; R4-093828 Enhanced Cell ID Requirements, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050393417, [retrieved on Oct. 6, 2009].

CATT: "User Plane scheme for TA+AOA method", 3GPP Draft; R2-095225, 3rd Generation Partnership Project (3GPP), Mobile Competence Centre ; 650, Route Des Lucioles ; F-06921 Sophia-Antipolis CEDEX ; France, No. Shenzhen, China; Aug. 24, 2009, XP050389746, [retrieved on Aug. 26, 2009].

3GPP TS 36.305 V9.0.0 (Sep. 2009) "3rd Generation Partnership Project (3GPP); Evolved Universal Terrestrial Radio Access Network (E-UTRAN); Stage 2 functional specification of User Equipment (UE) positioning in E-UTRAN (Release 9)", 3GPP Technical Specification Group Radio Access Network. 3GPP TS 36.305 V9.0.0,-Sep. 28, 2009, pp. 21-28, XP008156660.

Supplementary European Search Report for EP 10 82 5944.

* cited by examiner

METHOD, SYSTEM AND DEVICE FOR IMPLEMENTING POSITIONING MEASUREMENT

The present application is a U.S. National Stage of International Application No. PCT/CN2010/001717, filed on Oct. 28, 2010, designating the United States, and claiming the benefit of Chinese Patent Application no. 200910235920.0, filed with the Chinese Patent Office on Oct. 29, 2009 and entitled "method, system and device for implementing positioning measurement", the disclosures of both of which are hereby incorporated by reference in their entirety.

FIELD OF THE INVENTION

The present invention relates to the field of communications and particularly a method, system and device for implementing positioning measurement.

BACKGROUND OF THE INVENTION

Figure 1:
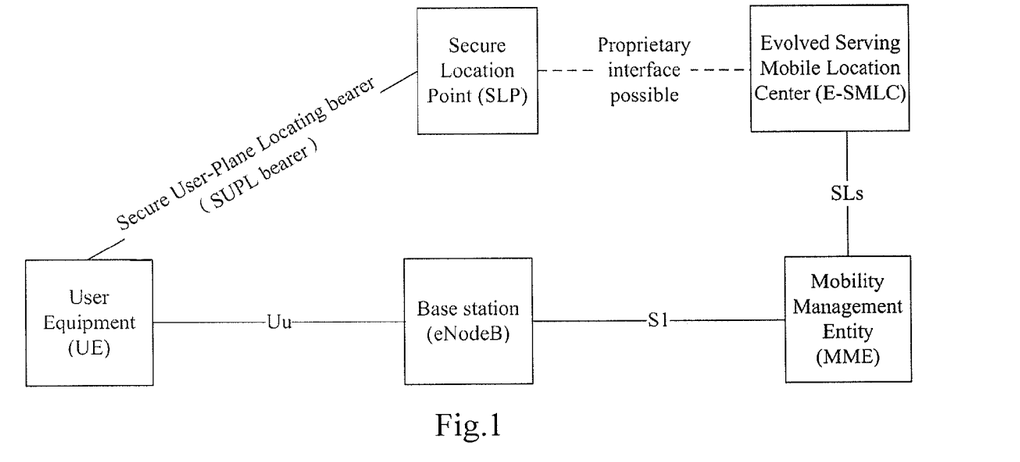
FIG. 1 is a schematic diagram of a positioning architecture related to an E-UTRAN in the prior art.

Referring to FIG. 1, a positioning architecture related to an Evolved Universal Terrestrial Radio Access Network (E-UTRAN) generally includes an Evolved Serving Mobile Location Center (E-SMLC), a Mobility Management Entity (MME), a base station (eNB) and a User Equipment (UE).

A mobile location service is a service, for example, of emergent rescuing, deployed based upon the location of a UE. At present, two positioning methods are available as follows: control-plane location and secure user-plane location. Control-plane location refers to a positioning process in which an E-UTRAN signaling link is required so that the MME transmits a positioning request to the E-SMLC to trigger the positioning process and the E-SMLC returns a positioning result to the MME after performing positioning operations and in which the E-SMLC, the MME, the eNB, the UE, etc., may participate.

The E-SMLC translates a required location requested by a client into corresponding E-UTRAN measurement parameters, selects a positioning method and calculates a final result and precision from a returned estimation result of the location. The MME provides a Location service (LCS) with a mobility management function, which includes notifying the E-SMLC/a Gateway Mobile Location Center (GMLC) about movement of the UE. The eNB provides the E-SMLC with measurement result related to the location service, and passes auxiliary information required for the location service, etc. The UE provides the E-SMLC with measurement result related to the location service.

In an existing Long Term Evolution (LTE) system, a control-plane based positioning method includes :the Cell Identifier (Cell ID)+Timing Advance (TA)+Angle Of Arrival (AOA) scheme, the Observed Time Difference of Arrival (OTDOA) scheme, i.e., the Enhanced Cell Identity (E-CID) scheme, and the enhanced Requirements for Support of Assisted Global Navigation Satellite System (A-GNSS) scheme.

A general principle of the Cell ID+TA+AOA scheme is to obtain the angle of the user equipment to the base station relative to the north direction (i.e., AOA) and a TA of the user equipment to calculate the location. In the LTE, the TA can be obtained by being maintained at the user equipment or being measured at the base station.

The eNB obtains via an intelligent antenna the AOA at which the UE transmits a signal, and the UE is located on a ray which originates from the eNB and is rotated counterclockwise from the north direction by an angle of AOA.

Figure 2:
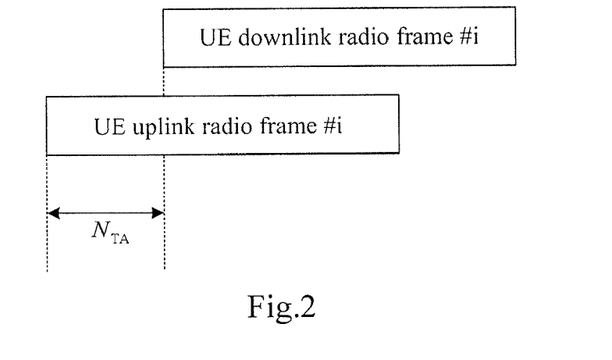
FIG. 2 is a schematic diagram of a timing advance in the prior art.

Referring to FIG. 2, the Timing Advance ($N_{TA}$) refers to the offset between uplink and downlink frame timings at the UE.

Figure 3:
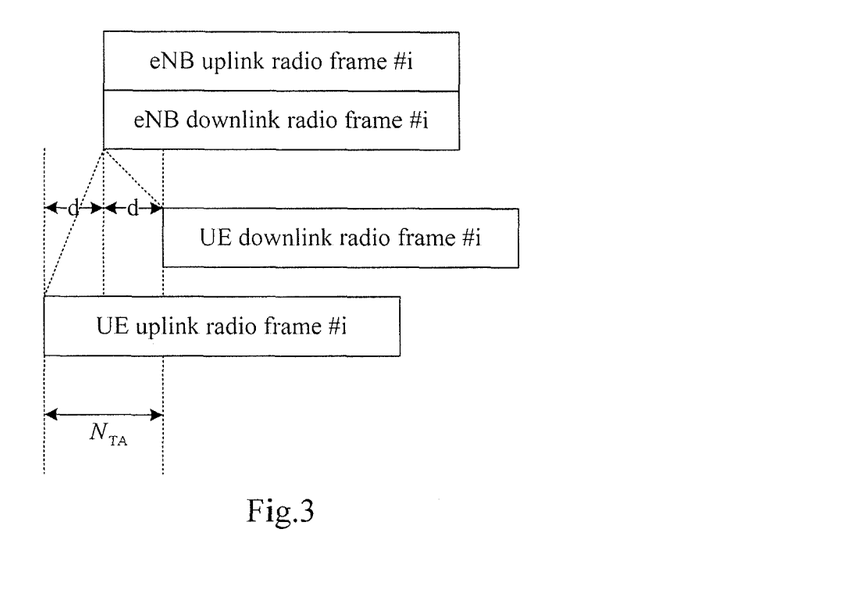
FIG. 3 is a schematic diagram of the delay distance between uplink and downlink sub-frames in the prior art.

Referring to FIG. 3, it can be considered in view of a timing at the base station that $N_{TA}$ is typically embodied as twice a delay due to a distance d.

The distance between the UE and the eNB can be derived from $N_{TA}$, and the UE is located on a circle with a center being at the eNB and a radius being the distance. The E-SMLC can calculate the location of the UE from the foregoing information and geographical location information of a serving cell.

The inventors have defined two types of TA report formats during their study: Type1 and Type2, where TADV represents information on a timing advance of a report.

Type1: TADV=(eNB Rx-Tx time difference)+(UE Rx-Tx time difference); and

Type2: TADV=eNB Rx-Tx time difference.

Wherein "UE Rx-Tx time difference" represents the difference between reception and transmission time at the user equipment and "eNB Rx-Tx time difference" represents the difference between reception time and transmission time at the base station.

However it is unknown for the eNB how to select an appropriate TA format in the existing Cell ID+TA+AOA positioning scheme, so there is a need of introducing a mechanism to ensure a timing advance of a report from the eNB.

SUMMARY OF THE INVENTION

Embodiments of the invention provide a method, system and device for implementing positioning measurement to address the problem in the prior art that a base station can not determine a specific timing advance report format to be adopted for returning a positioning measurement result to an E-SMLC.

An embodiment of the invention provides a method for implementing positioning measurement including:

A. determining a TA report format according to obtained information on whether a user equipment supports measurement of the difference between reception time and transmission time and information on whether a base station supports combining of measurement of the difference between reception time and transmission time of the base station and measurement of the difference between reception time and transmission time of the user equipment in an E-CID positioning process of the user equipment; and B. the base station returning a positioning measurement result to an E-SMLC in the determined TA report format after performing E-CID positioning measurement.

An embodiment of the invention provides a system for implementing positioning measurement including a determining unit, a base station and an E-SMLC, wherein:

the determining unit is configured to determine a TA report format according to obtained information on whether a user equipment supports measurement of the difference between reception time and transmission time and information on whether a base station supports combining of measurement of the difference between reception time and transmission time of the base station and measurement of the difference between reception time and transmission time of the user equipment in an E-CID positioning process of the user equipment;

the base station is configured to return a positioning measurement result to the E-SMLC in the TA report format determined by the determining unit; and the E-SMLC is configured to receive a location service request message from a mobility management entity, and then if the E-CID mode is adopted, then to transmit an E-CID positioning measurement request to the base station and receive the positioning measurement result returned from the base station.

An embodiment of the invention provides an E-SMLC including:

a receiving unit configured to receive a location service request message from a mobility management entity;

an obtaining unit configured to obtain information from a user equipment on whether the user equipment supports measurement of the difference between reception time and transmission time of the user equipment and information from a base station on whether the base station supports combining of measurement of the difference between reception time and transmission time of the base station and measurement of the difference between reception time and transmission time of the user equipment;

a control unit configured to determine information on a TA report format according to whether the user equipment supports measurement of the difference between reception time and transmission time of the user equipment and whether the base station supports combining of measurement of the difference between reception time and transmission time of the base station and measurement of the difference between reception time and transmission time of the user equipment when the E-CID mode is determined to be adopted; and a transmitting unit configured to transmit the information on the determined TA report format to the base station in an E-CID positioning measurement request.

An embodiment of the invention provides a base station including:

a receiving unit configured to receive an E-CID positioning measurement request, including information on a TA report format, transmitted from an E-SMLC;

a positioning measurement unit configured to perform E-CID positioning measurement in response to the E-CID positioning measurement request; and a transmitting unit configured to return a positioning measurement result to the E-SMLC in the TA report format.

An embodiment of the invention provides an E-SMLC including:

a receiving unit configured to receive a location service request message carrying quality of service information from a mobility management entity;

an obtaining unit configured to obtain information from a user equipment on whether the user equipment supports measurement of the difference between reception time and transmission time of the user equipment;

a control unit configured to determine information on a TA report format adoptable by a base station according to whether the user equipment supports measurement of the difference between reception time and transmission time of the user equipment and the quality of service information when the E-SMLC determines the E-CID mode to be adopted; and a transmitting unit configured to transmit the information on the TA report format to the base station in an E-CID positioning measurement request.

An embodiment of the invention provides a base station including:

a receiving unit configured to receive an E-CID positioning measurement request, including information on an adoptable TA report format, transmitted from an E-SMLC;

a control unit configured to determine information on a TA report format to be actually adopted according to whether to support combining of measurement of the difference between reception time and transmission time of the base station and measurement of the difference between reception time and transmission time of a user equipment and the information on the adoptable TA report format;

a positioning measurement unit configured to perform E-CID positioning measurement in response to the E-CID positioning measurement request; and a transmitting unit configured to return a positioning measurement result to the E-SMLC in the determined TA report format.

An embodiment of the invention provides an E-SMLC including:

a receiving unit configured to receive a location service request message carrying quality of service information from a mobility management entity;

a control unit configured to determine information on an adoptable TA report format according to the quality of service information when the E-CID mode is determined to be adopted; and a transmitting unit configured to transmit the information on the TA report format to the base station in an E-CID positioning measurement request.

An embodiment of the invention provides a base station including:

a receiving unit configured to receive an E-CID positioning measurement request, including information on an adoptable TA report format, transmitted from an E-SMLC;

a control unit configured to determine information on a TA report format to be actually adopted according to the information on the adoptable TA report format, whether to support combining of measurement of the difference between reception time and transmission time of the base station and measurement of the difference between reception time and transmission time of a user equipment and a result of testing whether the user equipment supports measurement of the difference between reception time and transmission time of the user equipment; and a transmitting unit configured to return a positioning measurement result to the E-SMLC in the determined TA report format.

An embodiment of the invention provides an E-SMLC including:

a receiving unit configured to receive a location service request message from a mobility management entity;

an obtaining unit configured to obtain information from a user equipment on whether the user equipment supports measurement of the difference between reception time and transmission time of the user equipment;

a control unit configured to determine a positioning mode; and a transmitting unit configured to transmit to a base station an E-CID positioning measurement request for the user equipment including the information on whether the user equipment supports measurement of the difference between reception time and transmission time of the user equipment when the E-CID mode is determined to be adopted.

An embodiment of the invention provides a base station including:

a receiving unit configured to receive an E-CID positioning measurement request, including information on whether a user equipment to be positioned supports measurement of the difference between reception time and transmission time of the user equipment, transmitted from an E-SMLC;

a control unit configured to determine information on a TA report format according to whether the base station supports combining of measurement of the difference between reception time and transmission time of the base station and measurement of the difference between reception time and transmission time of the user equipment and the information on whether the user equipment supports measurement of the difference between reception time and transmission time of the user equipment; and a transmitting unit configured to return a positioning measurement result to the E-SMLC in the determined TA report format.

An embodiment of the invention provides an E-SMLC including:

a receiving unit configured to receive a location service request message from a mobility management entity;

a control unit configured to determine a positioning mode; and a transmitting unit configured to transmit an E-CID positioning measurement request for a user equipment to a base station when the E-CID mode is determined to be adopted.

An embodiment of the invention provides a base station including:

a receiving unit configured to receive an E-CID positioning measurement request transmitted from an E-SMLC;

a control unit configured to determine information on a TA report format according to whether the base station supports combining of measurement of the difference between reception time and transmission time of the base station and measurement of the difference between reception time and transmission time of a user equipment and a result of testing whether the user equipment supports measuring of the difference between reception time and transmission time of the user equipment; and a transmitting unit configured to return a positioning measurement result to the E-SMLC in the determined TA report format.

In the embodiments of the invention, a TA report format is determined in E-CID measurement according to obtained information on whether a user equipment supports measurement of the difference between reception time and transmission time and information on whether a base station supports combining of measurement of the difference between reception time and transmission time of the base station and measurement of the difference between reception time and transmission time of the user equipment to thereby provide definite information on the format in which the base station reports a positioning measurement result and thus improve the existing various positioning schemes.

DETAILED DESCRIPTION OF THE EMBODIMENTS

In order to address the problem in the existing E-CID positioning scheme that a TA report format can not be selected, embodiments of the invention determines a TA report format according to obtained information on whether a user equipment supports measurement of the difference between reception time and transmission time and information on whether a base station supports combining of measurement of the difference between reception time and transmission time of the base station and measurement of the difference between reception time and transmission time of the user equipment.

Figure 4:
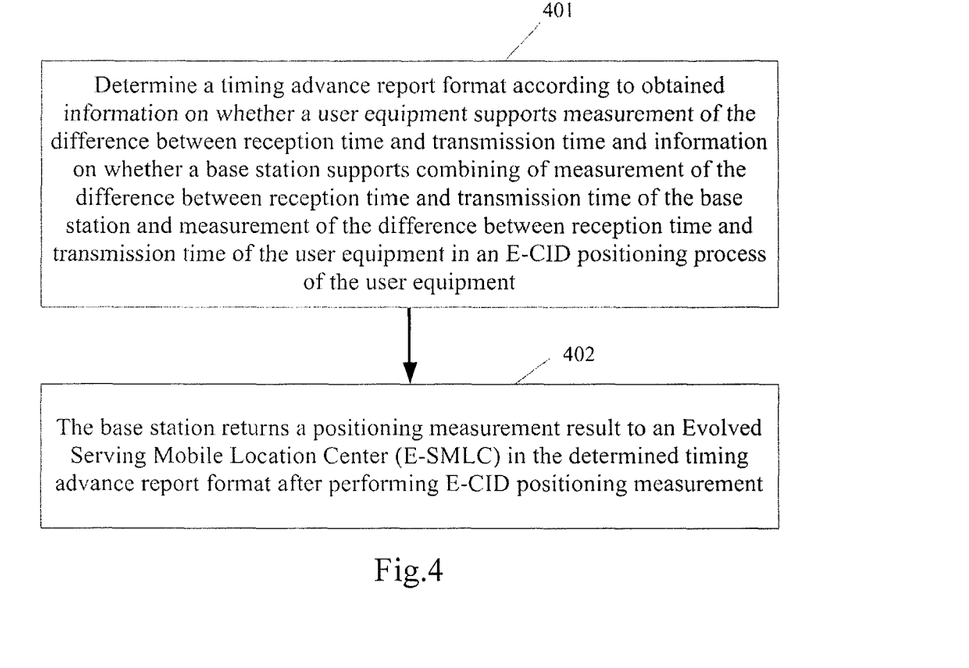
FIG. 4 is a schematic flow diagram of a method for implementing positioning measurement according to an embodiment of the invention.

Referring to FIG. 4, a method for implementing positioning measurement according to an embodiment of the invention includes the following steps:

Step 401, determining a timing advance report format in an E-CID positioning process of the user equipment according to obtained information on whether a user equipment supports measurement of the difference between reception time and transmission time and information on whether a base station supports combining of measurement of the difference between reception time and transmission time of the base station and measurement of the difference between reception time and transmission time of the user equipment.

The step 401 can be performed particularly as follows: an E-SMLC receives a location service request message from a mobility management entity and obtains information from a user equipment on whether the user equipment supports measurement of the difference between reception time and transmission time of the user equipment and information from a base station on whether the base station supports combining of measurement of the difference between reception time and transmission time of the base station and measurement of the difference between reception time and transmission time of the user equipment; and if the E-SMLC determines the E-CID mode to be adopted, then it determines information on a TA report format according to whether the user equipment supports measurement of the difference between reception time and transmission time of the user equipment and whether the base station supports combining of measurement of the difference between reception time and transmission time of the base station and measurement of the difference between reception time and transmission time of the user equipment, and transmits the information on the determined TA report format to the base station in an E-CID positioning measurement request.

The step 401 can alternatively be performed as follows: an E-SMLC receives a location service request message carrying quality of service information from a mobility management entity and obtains information from a user equipment on whether the user equipment supports measurement of the difference between reception time and transmission time of the user equipment; if the E-SMLC determines the E-CID mode to be adopted, then it determines information on a TA report format adoptable by a base station according to whether the user equipment supports measurement of the difference between reception time and transmission time of the user equipment and the quality of service information, and transmits the information on the TA report format to the base station in an E-CID positioning measurement request; and the base station determines information on a TA report format to be actually adopted according to whether to support combining of measurement of the difference between reception time and transmission time of the base station and measurement of the difference between reception time and transmission time of the user equipment and the information on the adoptable TA report format.

The step 401 can alternatively be performed as follows: an E-SMLC receives a location service request message carrying quality of service information from a mobility management entity, and if the E-CID mode is determined to be adopted, then it determines information on an adoptable TA report format according to the quality of service information and transmits the information on the TA report format to a base station in an E-CID positioning measurement request; and the base station determines information on a TA report format to be actually adopted according to the information on the adoptable TA report format, whether to support combining of measurement of the difference between reception time and transmission time of the base station and measurement of the difference between reception time and transmission time of a user equipment and a result of testing whether the user equipment supports measurement of the difference between reception time and transmission time.

In the foregoing two implementations, if the information on the determined TA report to be actually adopted format is different from the information on the adoptable TA report format, then the base station returns a positioning measurement result including information on a reason the transmitted adoptable TA report format is not adopted.

The step 401 can alternatively be performed as follows: an E-SMLC receives a location service request message carrying quality of service information from a mobility management entity and obtains information from a user equipment on whether the user equipment supports measurement of the difference between reception time and transmission time of the user equipment; if the E-SMLC determines the E-CID mode to be adopted, then it transmits to a base station an E-CID positioning measurement request for the user equipment including the information on whether the user equipment supports measurement of the difference between reception time and transmission time of the user equipment; and the base station determines information on a TA report format according to whether it supports combining of measurement of the difference between reception time and transmission time of the base station and measurement of the difference between reception time and transmission time of the user equipment, and the information on whether the user equipment supports measurement of the difference between reception time and transmission time of the user equipment.

The step 401 can alternatively be performed as follows: an E-SMLC receives a location service request message carrying quality of service information from a mobility management entity, and if the E-CID mode is determined to be adopted, then it transmits an E-CID positioning measurement request for a user equipment to a base station; and the base station determines information on a TA report format according to whether it supports combining of measurement of the difference between reception time and transmission time of the base station and measurement of the difference between reception time and transmission time of the user equipment and a result of testing whether the user equipment supports measurement of the difference between reception time and transmission time of the user equipment.

Step 402, the base station returns a positioning measurement result to an E-SMLC in the determined timing advance report format after performing E-CID positioning measurement.

The technical solution of the invention will be detailed below in specific embodiments thereof.

The E-SMLC is responsible for processing a positioning request from the MME and selects an appropriate positioning method according to Quality of Service (QoS) information of the user equipment in combination with the capabilities of the UE and the eNB. Currently supportable positioning methods include E-CID, OTDOA, A-GNSS, etc. In the E-CID positioning method, an R9 UE may or may not support measurement of the difference between reception time and transmission time of the user equipment (UE Rx-Tx time difference), so the E-SMLC interacts with the UE about capability information in the LTE Positioning Protocol A (LPPa) to thereby obtain its capability to support measurement of UE Rx-Tx time difference, and for the eNB, also there is an issue of whether it is capable of supporting combining of measurement of the difference between reception time and transmission time of the base station (eNB Rx-Tx time difference) and measurement of UE Rx-Tx time difference, so the E-SMLC can obtain capability information of the eNB in the LPPa protocol. Thus the E-SMLC can determine whether the Type1 TA report format or the Type2 TA report format is adopted according to the two capabilities in combination and notify the eNB about information the selected format in an LPPa message.

Figure 5:
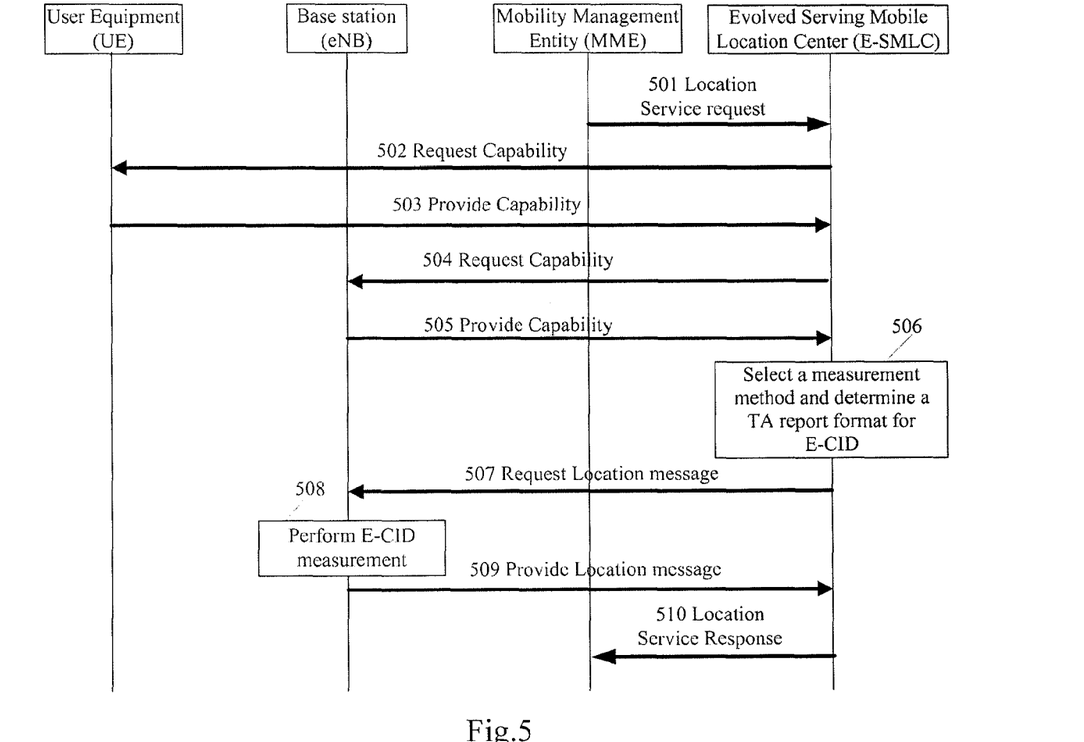
FIG. 5 is a schematic flow diagram of a first embodiment of the method for implementing positioning measurement according to the invention.

Referring to FIG. 5, a specific process in a first embodiment of the implementation of positioning measurement according to the invention is as follows:

Step 501, the E-SMLC receives a Location Service Request message carrying a QoS from the MME;

Steps 502 and 503, the E-SMLC transmits a Request Capability message to the UE in the LPPa protocol, and the UE returns to the E-SMLC in the LPPa protocol a Provide Capability message including information on whether the UE supports measurement of the difference between reception time and transmission time of the user equipment.

Steps 504 and 505, the E-SMLC transmits a Request Capability message to the eNB in the LPPa protocol, and the eNB returns to the E-SMLC a Provide Capability message including information on whether the eNB supports combining of measurement of the difference between reception time and transmission time of the base station and measurement of the difference between reception time and transmission time of the user equipment upon reception of the Request Capability message.

Step 506, the E-SMLC determines a positioning method to be adopted according to whether the UE supports measurement of the difference between reception time and transmission time of the user equipment and whether the eNB supports combining of measurement of the difference between reception time and transmission time of the base station and measurement of the difference between reception time and transmission time of the user equipment, and if the E-CID mode is determined to be adopted, then it determines information on a TA report format to be adopted by the eNB according to whether the UE supports measurement of the difference between reception time and transmission time of the user equipment and whether the eNB supports combining of measurement of the difference between reception time and transmission time of the base station and measurement of the difference between reception time and transmission time of the user equipment. The information on the TA report format can be determined according to another parameter(s) as well, e.g., information on the QoS, etc.

Step 507, the E-SMLC transmits a Request Location message carrying the information on the TA report format to the eNB in the LPPa protocol to initiate E-CID positioning measurement for the UE.

Steps 508 and 509, the eNB performs E-CID measurement upon reception of the Request Location message and returns a Provide Location message carrying a positioning measurement result to the E-SMLC.

Step 510, the E-SMLC returns a Location Service Response message to the MME.

Figure 6:
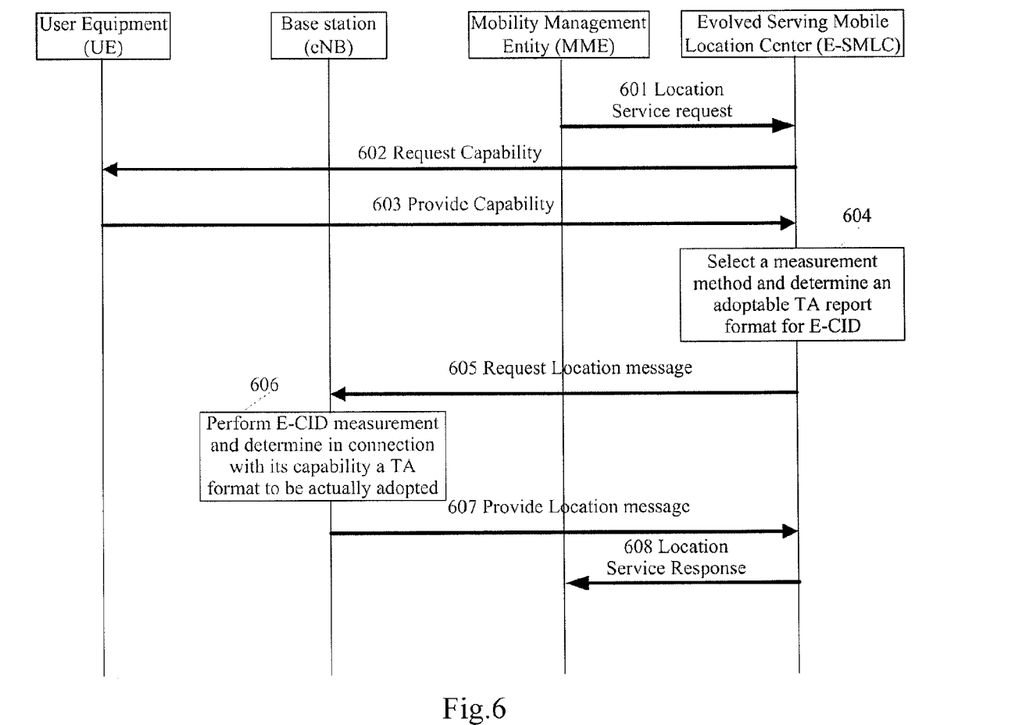
FIG. 6 is a schematic flow diagram of a second embodiment of the method for implementing positioning measurement according to the invention.

Referring to FIG. 6, a specific process in a second embodiment of the implementation of positioning measurement according to the invention is as follows:

Step 601, the E-SMLC receives a Location Service Request message carrying a QoS from the MME;

Steps 602 and 603, the E-SMLC transmits a Request Capability message to the UE in the LPPa protocol, and the UE returns to the E-SMLC in the LPPa protocol a Provide Capability message including information on whether the UE supports measurement of the difference between reception time and transmission time of the user equipment.

Step 604, the E-SMLC determines a positioning method to be adopted according to the QoS and whether the UE supports measurement of the difference between reception time and transmission time of the user equipment; and if the E-CID mode is determined to be adopted, then it determines information on an adoptable TA report format according to whether the UE supports measurement of the difference between reception time and transmission time of the user equipment and information on the QoS.

Step 605, the E-SMLC transmits a Request Location message, i.e., a positioning measurement request message, including the information on the adoptable TA report format to the eNB in the LPPa protocol to initiate E-CID positioning measurement for the UE.

Step 606, the eNB determines a TA report format to be actually adopted according to its capability and performs E-CID measurement.

The TA report format to be actually adopted is determined as follows:

If combining of measurement of eNB Rx-Tx time difference and measurement of UE Rx-Tx time difference is supported, then the Type1 TA report format will be adopted; otherwise, the Type2 TA report format will be adopted and a reason will be indicated in CAUSE.

Step 607, carrying a positioning measurement result in a response message returned to the E-SMLC.

Step 608, the E-SMLC returns a Location Service Response message to the MME upon reception of the response message.

Figure 7:
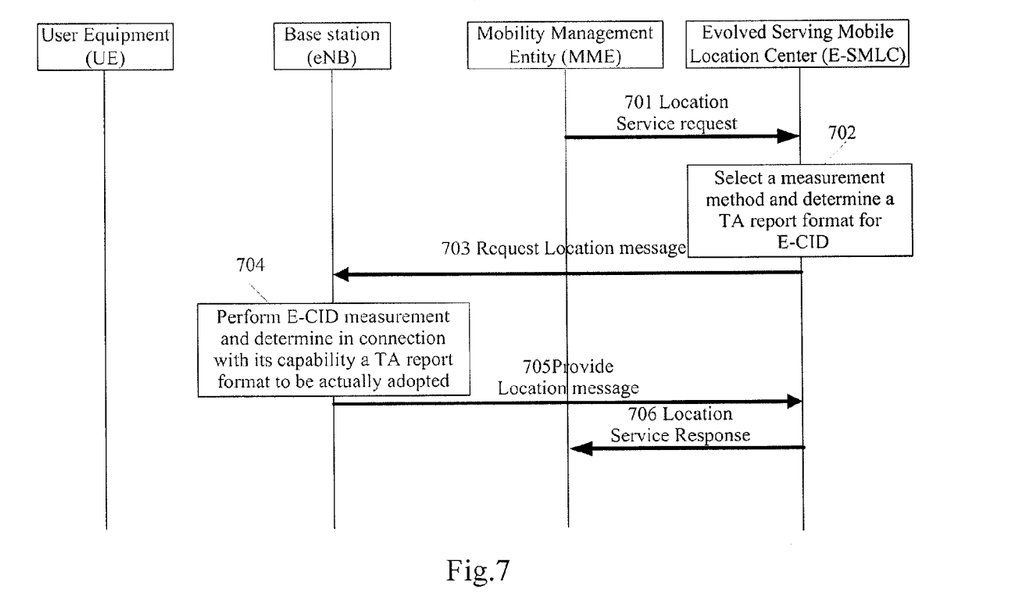
FIG. 7 is a schematic flow diagram of a third embodiment of the method for implementing positioning measurement according to the invention.

Referring to FIG. 7, a specific process of a third embodiment of the implementation of positioning measurement according to the invention is as follows:

Step 701, the E-SMLC receives a Location Service Request message carrying a QoS from the MME.

Step 702, the E-SMLC upon reception of the message determines an appropriate positioning method to be adopted according to stored information which here can include capability information of the UE and/or capability information of the base station, and can determine an adoptable TA report format in response to a QoS demand if the E-CID mode is adopted.

Step 703, the E-SMLC transmits a Request Location message indicating the TA report format adoptable by the eNB to initiate E-CID positioning measurement for the UE.

Step 704, the base station upon reception of the message finally determines a TA report format to be actually adopted according to its capability and measurement of the capability of the user equipment and performs E-CID measurement.

The TA report format to be actually adopted is finally determined according to its capability and measurement of the capability of the user equipment particularly as follows:

If it supports combining of measurement of eNB Rx-Tx time difference and measurement of UE Rx-Tx time difference, then it preferentially initiates a measurement control message of this type to the UE, and if failure indication is received, then it will report only Type2 TA and indicate a reason in CAUSE; otherwise, it will report Type1 TA. If it dose not support combining of measurement of eNB Rx-Tx time difference and measurement of UE Rx-Tx time difference, then it will report only Type1 TA and indicate a reason in CAUSE.

Step 705, the eNB carries a positioning measurement result in a response message returned to the E-SMLC in the determined TA report format to be actually adopted.

Step 706, the E-SMLC returns a Location Service Response message to the MME upon reception of the response message.

Figure 8:
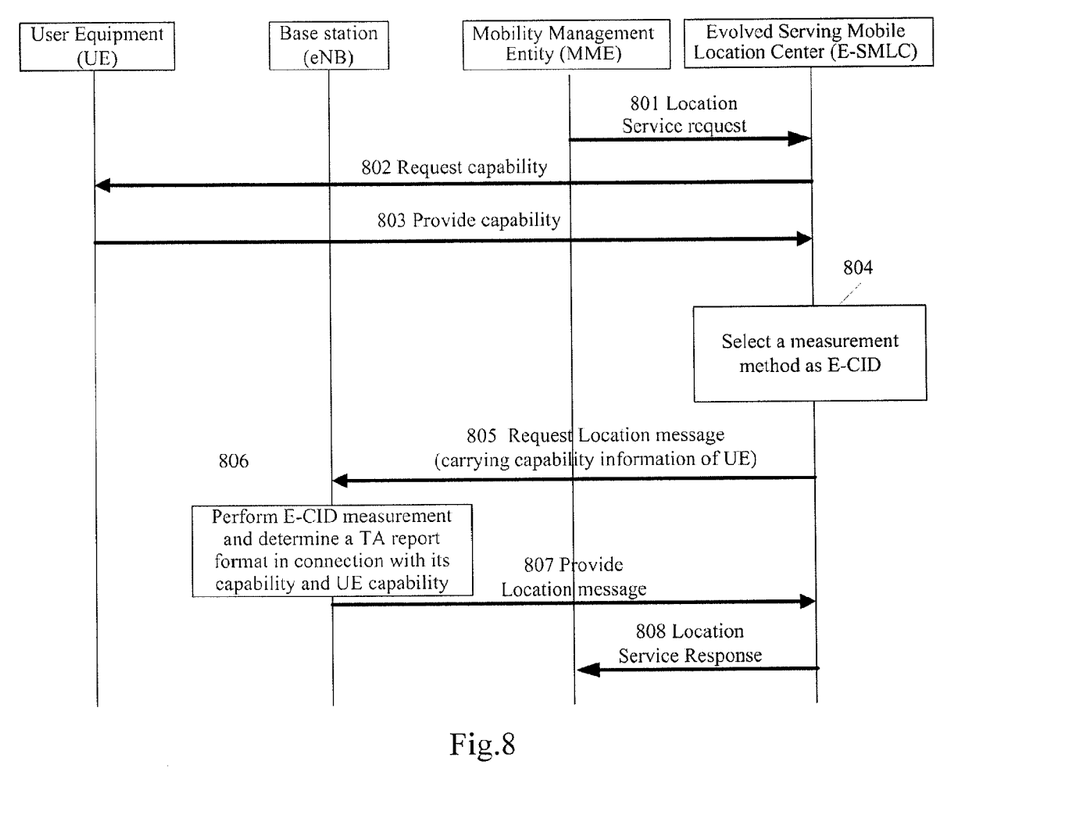
FIG. 8 is a schematic flow diagram of a fourth embodiment of the method for implementing positioning measurement according to the invention.

Referring to FIG. 8, a specific process in a fourth embodiment of the implementation of positioning measurement according to the invention is as follows:

Step 801, the E-SMLC receives a Location Service Request message carrying information on a QoS from the MME;

Steps 802 and 803, the E-SMLC transmits a Request Capability message to the UE in the LPPa protocol, and the UE returns to the E-SMLC in the LPPa protocol a Provide Capability message including information on whether the UE supports measurement of the difference between reception time and transmission time of the user equipment.

Step 804, the E-SMLC determines a positioning method to be adopted according to the QoS and whether the UE supports measurement of the difference between reception time and transmission time of the user equipment.

Step 805, if the E-CID mode is determined to be adopted in the step 804, then the E-SMLC transmits to the eNB in the LPPa protocol a positioning measurement request message carrying the information on whether the UE supports measurement of the difference between reception time and transmission time of the user equipment to initiate E-CID positioning measurement for the UE.

Step 806, the eNB determines a TA report format to be adopted according to its capability, i.e., whether it supports combining of measurement of the difference between reception time and transmission time of the base station and measurement of the difference between reception time and transmission time of the user equipment, and if both are supported, then the Type1 TA report format will be adopted, or if there is inconsistency or neither is supported, then the Type2 TA report format will be adopted; and the eNB performs E-CID measurement.

Step 807, the eNB carries a positioning measurement result in a response message returned to the E-SMLC in the determined TA report format.

Step 808, the E-SMLC returns a Location Service Response message to the MME upon reception of the response message.

Figure 9:
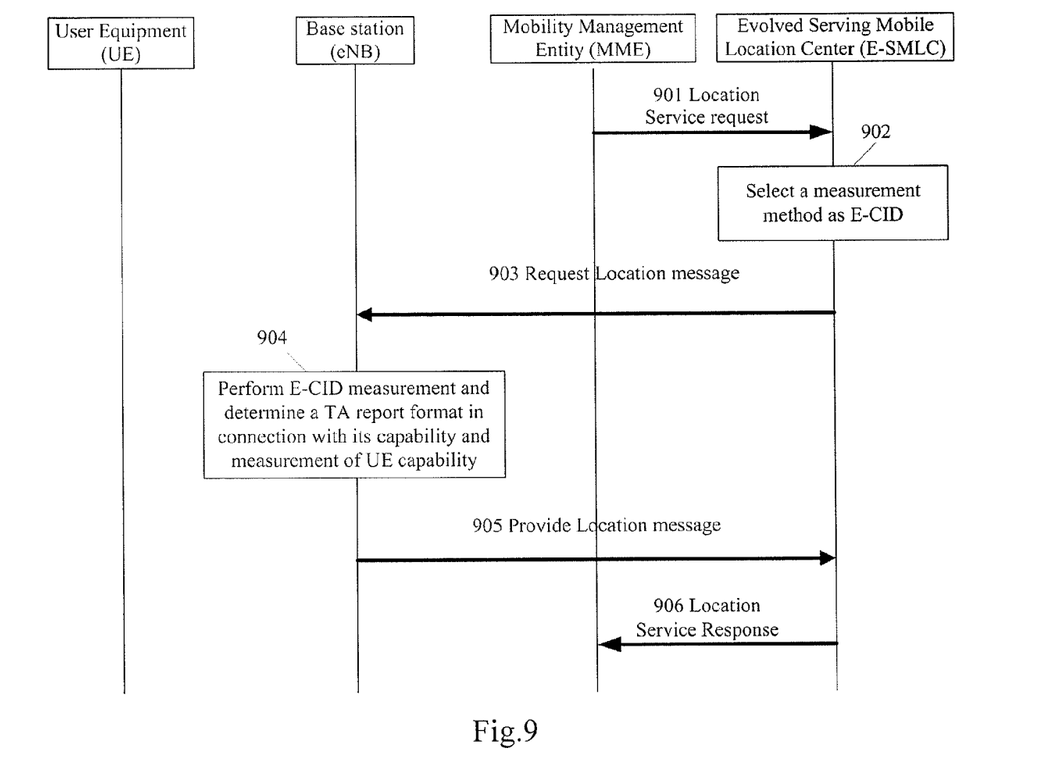
FIG. 9 is a schematic flow diagram of a fifth embodiment of the method for implementing positioning measurement according to the invention.

Referring to FIG. 9, a specific process in a fifth embodiment of the implementation of positioning measurement according to the invention is as follows:

Step 901, the E-SMLC receives a Location Service Request message carrying information on a QoS from the MME.

Step 902, the E-SMLC upon reception of the message determines an appropriate positioning method to be adopted according to stored information which can include pre-stored capability information of the UE and/or capability information of the base station.

Step 903, if the E-CID mode is determined to be adopted in the step 902, then the E-SMLC transmits a positioning measurement request message, i.e., an E-CID positioning measurement request message, to the eNB in the LPPa protocol to initiate E-CID positioning measurement for the UE.

Step 904, the eNB upon reception of the message determines a TA report format to be adopted according to its capability and measurement control on the user equipment and performs E-CID measurement.

The TA report format to be adopted is determined according to its capability and measurement control on the user equipment particularly as follows:

If it supports combining of measurement of eNB Rx-Tx time difference and measurement of UE Rx-Tx time difference, then it preferentially initiates a measurement control message of this type to the UE, and if failure indication is received, then it will report only Type2 TA; otherwise, it will report Type1 TA. If it dose not support combining of measurement of eNB Rx-Tx time difference and measurement of UE Rx-Tx time difference, then it will report only Type1 TA.

Step 905, the eNB carries a positioning measurement result in a response message returned to the E-SMLC.

Step 906, the E-SMLC returns a Location Service Response message to the MME upon reception of the response message.

Figure 10:
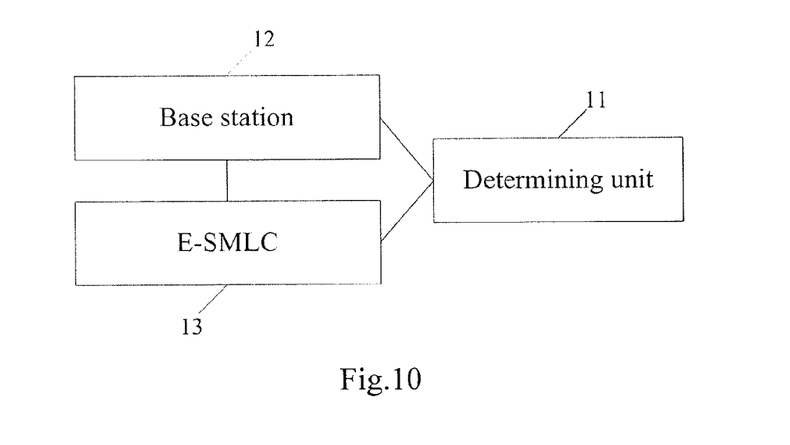
FIG. 10 is a schematic structural diagram of a system for implementing positioning measurement according to an embodiment of the invention.

Referring to FIG. 10, an embodiment of the invention provides a system for implementing positioning measurement including a determining unit 11, a base station 12 and an E-SMLC 13, where:

The determining unit 11 is configured to determine a timing advance report format according to obtained information on whether a user equipment supports measurement of the difference between reception time and transmission time and information on whether a base station supports combining of measurement of the difference between reception time and transmission time of the base station and measurement of the difference between reception time and transmission time of the user equipment in an E-CID positioning process of the user equipment;

The base station 12 is configured to report a positioning measurement result to the E-SMLC in the timing advance report format determined by the determining unit; and The E-SMLC 13 is configured to receive a location service request message from a mobility management entity, and then if the E-CID mode is adopted, then to transmit an E-CID positioning measurement request to the base station and receive the positioning measurement result returned from the base station.

When the determining unit 11 is located in the E-SMLC 13, that is, the E-SMLC 13 performs the function of determining the TA report format, the E-SMLC is configured to receive the location service request message from the mobility management entity, and then to obtain the information from the user equipment on whether the user equipment supports measurement of the difference between reception time and transmission time of the user equipment and the information from the base station on whether the base station supports combining of measurement of the difference between reception time and transmission time of the base station and measurement of the difference between reception time and transmission time of the user equipment, to determine a positioning mode according to whether the user equipment supports measurement of the difference between reception time and transmission time of the user equipment and whether the base station supports combining of measurement of the difference between reception time and transmission time of the base station and measurement of the difference between reception time and transmission time of the user equipment, and if the E-CID mode is adopted, then to determine information on the TA report format according to whether the user equipment supports measurement of the difference between reception time and transmission time of the user equipment and whether the base station supports combining of measurement of the difference between reception time and transmission time of the base station and measurement of the difference between reception time and transmission time of the user equipment and to transmit the information on the determined TA report format to the base station in the E-CID positioning measurement request.

When the determining unit 11 is located in the E-SMLC 13 and the base station 12, that is, the E-SMLC 13 and the base station 12 perform together the function of determining the TA report format, the E-SMLC is configured to receive the location service request message carrying quality of service information from the mobility management entity, to obtain the information from the user equipment on whether the user equipment supports measurement of the difference between reception time and transmission time of the user equipment, to determine a positioning mode according to whether the user equipment supports measurement of the difference between reception time and transmission time of the user equipment and the quality of service information, and if the E-CID mode is adopted, then to determine information on a TA report format adoptable by the base station according to whether the user equipment supports measurement of the difference between reception time and transmission time of the user equipment and the quality of service information and to transmit the information on the TA report format to the base station in the E-CID positioning measurement request; and the base station is configured to determine information on the TA report format to be actually adopted according to whether to support combining of measurement of the difference between reception time and transmission time of the base station and measurement of the difference between reception time and transmission time of the user equipment and the information on the adoptable TA report format.

When the determining unit 11 is located in the E-SMLC 13 and the base station 12, that is, the E-SMLC 13 and the base station 12 perform together the function of determining the TA report format, the E-SMLC is configured to receive the location service request message carrying quality of service information from the mobility management entity, to determine a positioning mode according to its stored information, and if the E-CID mode is adopted, then to determine information on an adoptable TA report format according to the quality of service information and to transmit the information on the TA report format to the base station in the E-CID positioning measurement request; and the base station is configured to determine information on the TA report format to be actually adopted according to the information on the adoptable TA report format, whether to support combining of measurement of the difference between reception time and transmission time of the base station and measurement of the difference between reception time and transmission time of the user equipment and a result of testing whether the user equipment supports measurement of the difference between reception time and transmission time of the user equipment.

When the determining unit 11 is located in the base station 12, that is, the base station 12 performs the function of determining the TA report format, the E-SMLC is configured to receive the location service request message carrying quality of service information from the mobility management entity, to obtain the information from the user equipment on whether the user equipment supports measurement of the difference between reception time and transmission time of the user equipment, to determine a positioning mode according to whether the user equipment supports measurement of the difference between reception time and transmission time of the user equipment and the quality of service, and if the E-CID mode is adopted, then to transmit to the base station the E-CID positioning measurement request for the user equipment including the information on whether the user equipment supports measurement of the difference between reception time and transmission time of the user equipment; and the base station is configured to determine information on the TA report format according to whether it supports combining of measurement of the difference between reception time and transmission time of the base station and measurement of the difference between reception time and transmission time of the user equipment and the information on whether the user equipment supports measurement of the difference between reception time and transmission time of the user equipment.

When the determining unit is located in the base station, that is, the base station 12 performs the function of determining the TA report format, the E-SMLC is configured to receive the location service request message carrying quality of service information from the mobility management entity, to determine a positioning mode according to its stored information, and if the E-CID mode is adopted, then to transmit the E-CID positioning measurement request for the user equipment to the base station; and the base station is configured to determine information on the TA report format according to whether it supports combining of measurement of the difference between reception time and transmission time of the base station and measurement of the difference between reception time and transmission time of the user equipment and a result of testing whether the user equipment supports measurement of the difference between reception time and transmission time of the user equipment.

The base station 12 is configured to return the positioning measurement result including information on a reason the transmitted adoptable TA report format is not adopted if the determined TA report format to be actually adpoted is different from the adoptable TA report format.

An embodiment of the invention provides an evolved serving mobile location center including:

A receiving unit, configured to receive a location service request message from a mobility management entity;

An obtaining unit, configured to obtain information from a user equipment on whether the user equipment supports measurement of the difference between reception time and transmission time of the user equipment and information from a base station on whether the base station supports combining of measurement of the difference between reception time and transmission time of the base station and measurement of the difference between reception time and transmission time of the user equipment;

A control unit, configured to determine information on a TA report format according to whether the user equipment supports measurement of the difference between reception time and transmission time of the user equipment and whether the base station supports combining of measurement of the difference between reception time and transmission time of the base station and measurement of the difference between reception time and transmission time of the user equipment if the E-CID mode is determined to be adopted; and A transmitting unit, configured to transmit the information on the determined TA report format to the base station in an E-CID positioning measurement request.

An embodiment of the invention provides a base station including:

A receiving unit, configured to receive an E-CID positioning measurement request, including information on a TA report format, transmitted from an E-SMLC;

A positioning measurement unit, configured to perform E-CID positioning measurement in response to the E-CID positioning measurement request; and A transmitting unit, configured to return a positioning measurement result to the E-SMLC in the TA report format.

An embodiment of the invention provides an E-SMLC including:

A receiving unit, configured to receive a location service request message carrying quality of service information from a mobility management entity;

An obtaining unit, configured to obtain information from a user equipment on whether the user equipment supports measurement of the difference between reception time and transmission time of the user equipment;

A control unit, configured to determine information on a TA report format adoptable by a base station according to whether the user equipment supports measurement of the difference between reception time and transmission time of the user equipment and the quality of service information when the E-CID mode is determined to be adopted; and A transmitting unit, configured to transmit the information on the TA report format to the base station in an E-CID positioning measurement request.

An embodiment of the invention provides a base station including:

A receiving unit, configured to receive an E-CID positioning measurement request, including information on an adoptable TA report format, transmitted from an E-SMLC;

A control unit, configured to determine information on a TA report format to be actually adopted according to whether to support combining of measurement of the difference between reception time and transmission time of the base station and measurement of the difference between reception time and transmission time of a user equipment and the information on the adoptable TA report format;

A positioning measurement unit, configured to perform E-CID positioning measurement in response to the E-CID positioning measurement request; and A transmitting unit, configured to return a positioning measurement result to the E-SMLC in the determined TA report format.

An embodiment of the invention provides an E-SMLC including:

A receiving unit, configured to receive a location service request message carrying quality of service information from a mobility management entity;

A control unit, configured to determine a positioning mode according to its stored information and to determine information on an adoptable TA report format according to the quality of service information if the E-CID mode is adopted; and A transmitting unit, configured to transmit the information on the TA report format to the base station in an E-CID positioning measurement request.

An embodiment of the invention provides a base station including:

A receiving unit, configured to receive an E-CID positioning measurement request, including information on an adoptable TA report format, transmitted from an E-SMLC;

A control unit, configured to determine information on a TA report format to be actually adopted according to the information on the adoptable TA report format, whether to support combining of measurement of the difference between reception time and transmission time of the base station and measurement of the difference between reception time and transmission time of a user equipment and a result of testing whether the user equipment supports measurement of the difference between reception time and transmission time of the user equipment; and A transmitting unit, configured to return a positioning measurement result to the E-SMLC in the determined TA report format.

An embodiment of the invention provides an E-SMLC including:

A receiving unit, configured to receive a location service request message carrying quality of service information from a mobility management entity;

An obtaining unit, configured to obtain information from a user equipment on whether the user equipment supports measurement of the difference between reception time and transmission time of the user equipment;

A control unit, configured to determine a positioning mode according to whether the user equipment supports measurement of the difference between reception time and transmission time of the user equipment and the quality of service; and A transmitting unit, configured to transmit to a base station an E-CID positioning measurement request for the user equipment including the information on whether the user equipment supports measurement of the difference between reception time and transmission time of the user equipment when the E-CID mode is determined to be adopted.

An embodiment of the invention provides a base station includes:

A receiving unit, configured to receive an E-CID positioning measurement request, including information on whether a user equipment to be positioned supports measurement of the difference between reception time and transmission time of the user equipment, transmitted from an E-SMLC;

A control unit, configured to determine information on a TA report format according to whether the base station supports combining of measurement of the difference between reception time and transmission time of the base station and measurement of the difference between reception time and transmission time of the user equipment and the information on whether the user equipment supports measuring of the difference between reception time and transmission time of the user equipment; and A transmitting unit, configured to return a positioning measurement result to the E-SMLC in the determined TA report format.

An embodiment of the invention provides an E-SMLC including:

A receiving unit, configured to receive a location service request message carrying quality of service information from a mobility management entity;

A control unit, configured to determine a positioning mode according to its stored information; and A transmitting unit, configured to transmit an E-CID positioning measurement request for a user equipment to a base station when the E-CID mode is determined to be adopted.

An embodiment of the invention provides a base station including:

A receiving unit, configured to receive an E-CID positioning measurement request transmitted from an E-SMLC;

A control unit, configured to determine information on a TA report format according to whether the base station supports combining of measurement of the difference between reception time and transmission time of the base station and measurement of the difference between reception time and transmission time of a user equipment and a result of testing whether the user equipment supports measuring of the difference between reception time and transmission time of the user equipment; and A transmitting unit, configured to return a positioning measurement result to the E-SMLC in the determined TA report format.

In the embodiments of the invention, a TA report format is determined in E-CID measurement according to obtained information on whether a user equipment supports measuring of the difference between reception time and transmission time and information on whether a base station supports combining of measurement of the difference between reception time and transmission time of the base station and measurement of the difference between reception time and transmission time of the user equipment to thereby provide definite information on the format in which the base station reports a positioning measurement result and thus improve the existing various positioning schemes, and the embodiments of the invention can be applicable to mobile communication systems of LTE, LTE-A, etc.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for implementing positioning measurement, comprising the steps of:
    A. determining a Timing Advance, TA, report format according to obtained information on whether a user equipment supports measurement of the difference between reception time and transmission time and information on whether a base station supports combining of measurement of the difference between reception time and transmission time of the base station and measurement of the difference between reception time and transmission time of the user equipment in an Enhanced Cell Identity, E-CID, positioning process of the user equipment; and
    B. the base station returning a positioning measurement result to an Evolved Serving Mobile Location Center, E-SMLC, in the determined TA report format after performing E-CID positioning measurement.

2. The method according to claim 1, wherein the step A comprises:
    the E-SMLC receiving a location service request message from a mobility management entity and obtaining information from the user equipment on whether the user equipment supports measurement of the difference between reception time and transmission time of the user equipment and the information from the base station on whether the base station supports combining of measurement of the difference between reception time and transmission time of the base station and measurement of the difference between reception time and transmission time of the user equipment; and
    if the E-SMLC determines the E-CID mode to be adopted, then determining the information on the TA report format according to whether the user equipment supports measurement of the difference between reception time and transmission time of the user equipment and whether the base station supports combining of measurement of the difference between reception time and transmission time of the base station and measurement of the difference between reception time and transmission time of the user equipment and transmitting the information on the determined TA report format to the base station in an E-CID positioning measurement request.

3. The method according to claim 1, wherein the step A comprises:
    the E-SMLC receiving a location service request message carrying quality of service information from a mobility management entity and obtaining the information from the user equipment on whether the user equipment supports measurement of the difference between reception time and transmission time of the user equipment;
    if the E-SMLC determines the E-CID mode to be adopted, then determining information on a TA report format adoptable by the base station according to whether the user equipment supports measurement of the difference between reception time and transmission time of the user equipment and the quality of service information and transmitting the information on the TA report format to the base station in an E-CID positioning measurement request; and
    the base station determining information on the TA report format to be actually adopted according to whether to support combining of measurement of the difference between reception time and transmission time of the base station and measurement of the difference between reception time and transmission time of the user equipment and the information on the adoptable TA report format.

4. The method according to claim 3, wherein the positioning measurement result comprises information on a reason the transmitted adoptable TA report format is not adopted if the determined TA report format to be actually adopted is different from the adoptable TA report format.

5. The method according to claim 1, wherein the step A comprises:
    the E-SMLC receiving a location service request message carrying quality of service information from a mobility management entity, and if the E-CID mode is determined to be adopted, then determining information on an adoptable TA report format according to the quality of service information and transmitting the information on the TA report format to the base station in an E-CID positioning measurement request; and
    the base station determines information on the TA report format to be actually adopted according to the information on the adoptable TA report format, whether to support combining of measurement of the difference between reception time and transmission time of the base station and measurement of the difference between reception time and transmission time of the user equipment and a result of testing whether the user equipment supports measurement of the difference between reception time and transmission time.

6. The method according to claim 5, wherein the positioning measurement result comprises information on a reason the transmitted adoptable TA report format is not adopted if the determined TA report format to be actually adopted is different from the adoptable TA report format.

7. The method according to claim 1, wherein the step A comprises:
    the E-SMLC receiving a location service request message from a mobility management entity and obtaining the information from the user equipment on whether the user equipment supports measurement of the difference between reception time and transmission time of the user equipment;
    if the E-SMLC determines the E-CID mode to be adopted, then transmitting to the base station an E-CID positioning measurement request for the user equipment comprising the information on whether the user equipment supports measurement of the difference between reception time and transmission time of the user equipment; and
    the base station determining the information on the TA report format according to whether it supports combining of measurement of the difference between reception time and transmission time of the base station and measurement of the difference between reception time and transmission time of the user equipment and the information on whether the user equipment supports measurement of the difference between reception time and transmission time of the user equipment.

8. The method according to claim 1, wherein the step A comprises:

the E-SMLC receiving a location service request message from a mobility management entity, and if the E-CID mode is determined to be adopted, then transmitting an E- CID positioning measurement request for the user equipment to the base station; and the base station determining the information on the TA report format according to whether it supports combining of measurement of the difference between reception time and transmission time of the base station and measurement of the difference between reception time and transmission time of the user equipment and a result of testing whether the user equipment supports measurement of the difference between reception time and transmission time of the user equipment.

9. An Evolved Serving Mobile Location Center, E-SMLC, comprising:

a receiving unit configured to receive a location service request message from a mobility management entity;

an obtaining unit configured to obtain information from a user equipment on whether the user equipment supports measurement of the difference between reception time and transmission time of the user equipment and information from a base station on whether the base station supports combining of measurement of the difference between reception time and transmission time of the base station and measurement of the difference between reception time and transmission time of the user equipment;

a control unit configured to determine information on a Timing Advance, TA, report format according to whether the user equipment supports measurement of the difference between reception time and transmission time of the user equipment and whether the base station supports combining of measurement of the difference between reception time and transmission time of the base station and measurement of the difference between reception time and transmission time of the user equipment when the Enhanced Cell Identity, E-CID, mode is determined to be adopted; and a transmitting unit configured to transmit the information on the determined TA report format to the base station in an E-CID positioning measurement request.

10. An Evolved Serving Mobile Location Center, E-SMLC, comprising:

a receiving unit configured to receive a location service request message carrying quality of service information from a mobility management entity;

an obtaining unit configured to obtain information from a user equipment on whether the user equipment supports measurement of the difference between reception time and transmission time of the user equipment;

a control unit configured to determine information on a Timing Advance, TA, report format adoptable by a base station according to whether the user equipment supports measurement of the difference between reception time and transmission time of the user equipment and the quality of service information when the E-SMLC determines the Enhanced Cell Identity, E-CID, mode to be adopted; and a transmitting unit configured to transmit the information on the TA report format to the base station in an E-CID positioning measurement request, wherein the base station determines information on a TA report format to be actually adopted according to whether to support combining measurement of the difference between reception time and transmission time of the base station and measurement of the difference between reception time and transmission time of a user equipment and the information on the adoptable TA report format.

11. A base station, comprising:

a receiving unit configured to receive an Enhanced Cell Identity, E-CID, positioning measurement request, including information on an adoptable Timing Advance, TA, report format, transmitted from an Evolved Serving Mobile Location Center, E-SMLC;

a control unit configured to determine information on a TA report format to be actually adopted according to whether to support combining of measurement of the difference between reception time and transmission time of the base station and measurement of the difference between reception time and transmission time of a user equipment and the information on the adoptable TA report format;

a positioning measurement unit configured to perform E-CID positioning measurement in response to the E-CID positioning measurement request; and a transmitting unit configured to return a positioning measurement result to the E-SMLC in the determined TA report format.

* * * * *